(12) United States Patent
Maalouf

(10) Patent No.: US 10,794,231 B2
(45) Date of Patent: Oct. 6, 2020

(54) REVERSIBLE SYSTEM FOR DISSIPATING THERMAL POWER GENERATED IN A GAS-TURBINE ENGINE

(71) Applicant: SAFRAN, Paris (FR)

(72) Inventor: Samer Maalouf, Moissy-Cramayel (FR)

(73) Assignee: SAFRAN, Paris (FR)

( * ) Notice: Subject to any disclaimer, the term of this patent is extended or adjusted under 35 U.S.C. 154(b) by 86 days.

(21) Appl. No.: 16/302,184

(22) PCT Filed: May 19, 2017

(86) PCT No.: PCT/FR2017/051223
§ 371 (c)(1),
(2) Date: Nov. 16, 2018

(87) PCT Pub. No.: WO2017/198965
PCT Pub. Date: Nov. 23, 2017

(65) Prior Publication Data
US 2019/0277165 A1   Sep. 12, 2019

(30) Foreign Application Priority Data
May 20, 2016 (FR) ...................................... 16 54508

(51) Int. Cl.
| | |
|---|---|
| *F01K 25/02* | (2006.01) |
| *F01K 15/00* | (2006.01) |
| *F02C 7/14* | (2006.01) |
| *F02C 7/141* | (2006.01) |
| *F02C 7/16* | (2006.01) |
| *F02C 7/18* | (2006.01) |
| *F02C 1/10* | (2006.01) |

(52) U.S. Cl.
CPC .............. *F01K 25/02* (2013.01); *F01K 15/00* (2013.01); *F02C 1/10* (2013.01); *F02C 7/14* (2013.01);
(Continued)

(58) Field of Classification Search
CPC .. F01K 25/02; F01K 15/00; F02C 7/16; F02C 7/14; F02C 7/141
See application file for complete search history.

(56) References Cited

U.S. PATENT DOCUMENTS

| | | | | |
|---|---|---|---|---|
| 3,879,945 A | * | 4/1975 | Summers .................. | F02G 1/02 60/522 |
| 4,094,169 A | * | 6/1978 | Schmerzler ............... | F25B 1/10 417/392 |

(Continued)

FOREIGN PATENT DOCUMENTS

| | | |
|---|---|---|
| EP | 2 396 378 | 12/2011 |
| FR | 2 951 250 A1 | 4/2015 |

(Continued)

OTHER PUBLICATIONS

International Search Report dated Jul. 11, 2017 in PCT/FR2017/051223 filed on May 19, 2017.

*Primary Examiner* — Shafiq Main
(74) *Attorney, Agent, or Firm* — Oblon, McClelland, Maier & Neustadt, L.L.P.

(57) ABSTRACT

A reversible system for dissipating heat power generated in a gas turbine engine, the system including a condenser-forming first heat exchanger, an evaporator-forming second heat exchanger, a scroll compressor suitable for operating as a compressor when the temperature of the cold source is higher than a predefined threshold temperature and as a turbine when the temperature of the cold source is lower than the threshold temperature, an expander and a pump arranged in parallel, and a control valve arranged upstream from the expander and the pump and suitable for directing the refrigerant fluid to the expander when the temperature of the cold source is higher than the threshold temperature and (Continued)

to the pump when the temperature of the cold source is lower than the threshold temperature.

6 Claims, 2 Drawing Sheets

(52) U.S. Cl.
CPC ................ *F02C 7/141* (2013.01); *F02C 7/16* (2013.01); *F02C 7/18* (2013.01); *F05D 2260/213* (2013.01); *F05D 2260/98* (2013.01); *Y02T 50/675* (2013.01)

(56) References Cited

U.S. PATENT DOCUMENTS

| | | | | |
|---|---|---|---|---|
| 6,138,466 | A * | 10/2000 | Lake | B60H 1/00278 62/199 |
| 6,474,087 | B1 | 11/2002 | Lifson | |
| 7,048,044 | B2 * | 5/2006 | Ban | B60H 1/00314 165/202 |
| 9,758,009 | B2 * | 9/2017 | Kardos | B60H 1/00278 |
| 9,855,815 | B2 * | 1/2018 | Saab | B60H 1/00278 |
| 2002/0184908 | A1 * | 12/2002 | Brotz | B60H 1/00 62/259.2 |
| 2009/0249802 | A1 * | 10/2009 | Nemesh | B60H 1/00278 62/56 |
| 2011/0284181 | A1 | 11/2011 | Rached | |
| 2015/0192033 | A1 | 7/2015 | Garassino et al. | |
| 2016/0032783 | A1 * | 2/2016 | Howes | F01K 3/006 60/650 |

FOREIGN PATENT DOCUMENTS

| | | |
|---|---|---|
| WO | WO 2008/107623 A2 | 9/2008 |
| WO | WO 2010/092282 A1 | 8/2010 |
| WO | WO 2014/013170 A1 | 1/2014 |
| WO | WO 2015/165477 A1 | 11/2015 |

* cited by examiner

REVERSIBLE SYSTEM FOR DISSIPATING THERMAL POWER GENERATED IN A GAS-TURBINE ENGINE

BACKGROUND OF THE INVENTION

The present invention relates to the general field of dissipating heat powers generated in a gas turbine engine. The invention relates in particular to cooling the oil circuit of an airplane turbine engine.

In known manner, a gas turbine engine includes an oil circuit that is used to lubricate and/or cool various pieces of equipment in the engine, such as bearings, gearboxes, etc. The engine also has a fuel circuit that feeds injectors mounted in the combustion chamber of the engine.

The oil flowing in the oil circuit of the engine is typically cooled by heat exchangers of the fuel/oil type, known as fuel cooled oil coolers (FCOCs) or of the air/oil type known as air cooled oil coolers (ACOCs).

FCOC heat exchangers perform two functions, both heating the fuel before it is injected into the combustion chamber, and also cooling the oil that is heated by the heat dissipated by the engine. Unfortunately, such FCOC heat exchangers are no longer sufficient to absorb all of the heat dissipated by the engine, in particular because the temperature to which the fuel can be raised is limited by safety constraints.

It is also known to have recourse as well to ACOC heat exchangers in order to provide additional cooling. Such heat exchangers operate by means of a stream of air that is typically bled off from the flow passage for the secondary air stream through the turbine engine and that is guided along a surface for exchanging heat with the oil circuit. ACOC heat exchangers may be of the "surface" type, in which they are in the form of a metal part of large area allowing oil to flow through channels machined therein. Heat is extracted by means of fins in contact with the air stream that has been bled off. In order to exchange large amounts of heat, such a heat exchanger needs to present a large area, and thus also presents weight and size that are large. ACOC heat exchangers may also be of the "brick" type. Such heat exchangers are relatively heavy and they suffer from the disadvantage of disturbing the air stream, and thus of penalizing the overall efficiency of the turbine engine (leading to an increase in its specific fuel consumption (SFC)).

Whatever the technology used for ACOC heat exchangers, they give rise to head losses in the flow passage for the secondary stream from which the air is bled, and they therefore give rise to a drop in the efficiency of the turbine engine with an increase in its specific fuel consumption (SFC). Furthermore, in future turbine engine architectures presenting an ultra-high bypass ratio (UHBR) it may be necessary to integrate gearing that needs to be cooled with oil, thus leading to the need for increased cooling for the oil in the oil circuit of the turbine engine.

In order to mitigate the drawbacks of ACOC heat exchangers, patent application WO 2014/013170 proposes replacing the air/oil heat exchanger of the oil cooling system with a thermodynamic device of the heat pump type. The advantage of such a device is that it enables the surface areas of heat exchangers to be reduced (and thus makes it possible to reduce the head losses caused by such heat exchangers) as a result of increasing the temperature difference between the hot source (oil) and the cold source (air). Specifically, with that device, it is possible to raise the refrigerant fluid that is used to temperatures that are much higher than the temperature of the oil, so as to obtain a temperature difference relative to air that may be well above 50° C., thereby increasing the effectiveness of the cooling system and making it possible to limit its size so as to avoid having an impact on the overall performance of the turbine engine.

Nevertheless, the savings achieved by that thermodynamic device in terms of reducing head losses induced by the heat exchangers are diminished by the cost associated with delivering the power needed to operate the compressor that forms part of the device.

OBJECT AND SUMMARY OF THE INVENTION

An object of the present invention is thus to provide a cooling system that does not present such drawbacks.

In accordance with the invention, this object is achieved by a reversible system for dissipating heat power generated in a gas turbine engine, the system comprising:

a condenser-forming first heat exchanger for exchanging heat between a refrigerant fluid and a cold source;

an evaporator-forming second heat exchanger for exchanging heat between the refrigerant fluid and a hot source generating heat power;

a scroll compressor arranged upstream from the first heat exchanger and downstream from the second heat exchanger; the scroll compressor being suitable for operating as a compressor when the temperature of the cold source is higher than a predefined threshold temperature and as a turbine when the temperature of the cold source is lower than the threshold temperature;

an expander and a pump arranged in parallel downstream from the first heat exchanger and upstream from the second heat exchanger; and a control valve arranged upstream from the expander and the pump and suitable for directing the refrigerant fluid to the expander when the temperature of the cold source is higher than the threshold temperature and to the pump when the temperature of the cold source is lower than the threshold temperature.

The heat power dissipation system of the invention is remarkable in that it presents operation that is reversible as a function of the temperature of the cold source. This operation is as follows.

During stages of flight in which the temperature of the cold source (typically air when the system is applied to cooling the oil of the oil circuit) is relatively high (e.g. higher than a threshold temperature of 20° C. and corresponding to stages of idling on the ground in hot conditions), the refrigerant fluid is heated and vaporized in the evaporator (second heat exchanger) using heat taken from the hot source (typically the oil of the oil circuit), and then compressed to high temperature and high pressure by the scroll compressor operating as a compressor. The refrigerant fluid is then condensed with the cold source by the condenser (first heat exchanger) so as to be finally expanded by passing through the expander (by appropriately controlling the control valve that serves to bypass the pump). When applied to cooling the oil of the oil circuit of a turbine engine, it is thus possible to raise the refrigerant fluid to temperatures that are well above the temperature of the oil, thereby increasing the effectiveness of the condenser and making it possible to limit its size so as to avoid impacting the overall performance of the turbine engine.

During stages of flight in which the temperature of the cold source is relatively low (and lower than the predefined threshold temperature), e.g. corresponding to stages of cruising flight under nominal or cold conditions, the temperature difference between the hot source (oil) and the cold source (air) becomes large enough to transform the power dissipated by the heat of the oil into mechanical work. Under such circumstances, the refrigerant fluid is heated and vaporized in the evaporator by the heat of the oil, and then the vapor is expanded in the scroll compressor operating as a turbine so as to produce mechanical work. The vapor is then condensed with air by the condenser and transformed into liquid, which is pumped by the pump (with the control valve serving to bypass the expander). As a result, during these stages of flight, the cooling system delivers mechanical work (instead of consuming it), thereby enabling the performance of the engine to be improved.

Furthermore, the stages of flight in which the temperature of the cold source (air) is relatively low are the longest (e.g. the stage of cruising flight is the longest portion of a flight). During these stages of flight, the system of the invention serves to deliver mechanical work instead of consuming it, and as a result the overall balance of the system in terms of performance compensates for the addition of the additional component elements of the system and for the drawbacks that are usually associated with such addition (energy consumption by the scroll compressor, size, weight, etc.).

In an application to cooling the oil of the oil circuit of the engine, the hot source generating heat power is the oil of the oil circuit of the engine and the cold source is air coming from a flow passage for the secondary stream through the engine. Under such circumstances, the first heat exchanger may be for positioning in the flow passage for the secondary stream through the engine, and the second heat exchanger, the scroll compressor, the expander, and the pump may be for positioning in a nacelle of the engine.

The invention also provides a gas turbine engine including an oil circuit and a reversible system as defined above for dissipating the heat power generated by the oil of the oil circuit.

The invention also provides a method of operating a reversible system as defined above, wherein the control valve is activated to direct all of the refrigerant fluid that has passed through the first heat exchanger to the expander when the temperature of the cold source is higher than the predefined threshold temperature, the scroll compressor then acting as a compressor, and wherein the control valve is activated to direct all of the refrigerant fluid that has passed through the first heat exchanger to the pump when the temperature of the cold source is lower than the predefined threshold temperature, the scroll compressor then operating as a turbine.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

The invention applies to dissipating any type of heat power generated in a gas turbine engine and that needs to be discharged.

The example described below relates more particularly to dissipating the heat power generated by heating the oil in an oil circuit of a turbine engine. Nevertheless, the system of the invention could equally well apply to dissipating heat power coming from the heating of various electrical components of a gas turbine engine, e.g. such as batteries or electrical power generators.

In known manner, the oil circuit of a turbine engine includes various pieces of equipment that use the cooling and/or lubricating oil, such as bearings (in particular for the turbine and compressor shafts), gearboxes (such as the accessory gearbox), electricity generators, etc.

The oil circuit also includes return pumps for recirculating the oil from the equipment to an oil tank, feed pumps, one or more filters, and one or more oil/fuel heat exchangers (FCOC heat exchangers).

The oil circuit also has a reversible oil cooling system of the invention.

Figure 1:
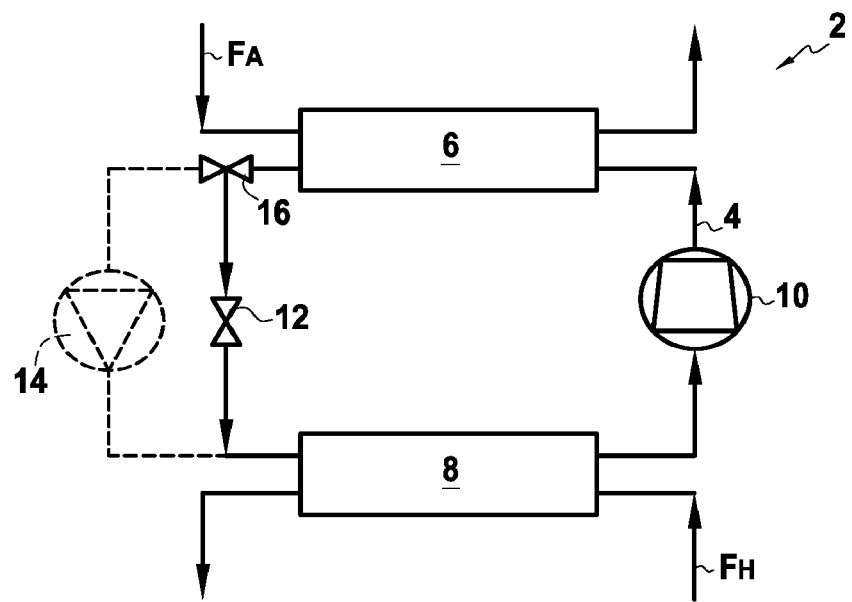
FIGS. 1 and 2 are diagrammatic views of a system of the invention for cooling the oil of a turbine engine oil circuit, the system being shown respectively in its two operating configurations.
Figure 2:
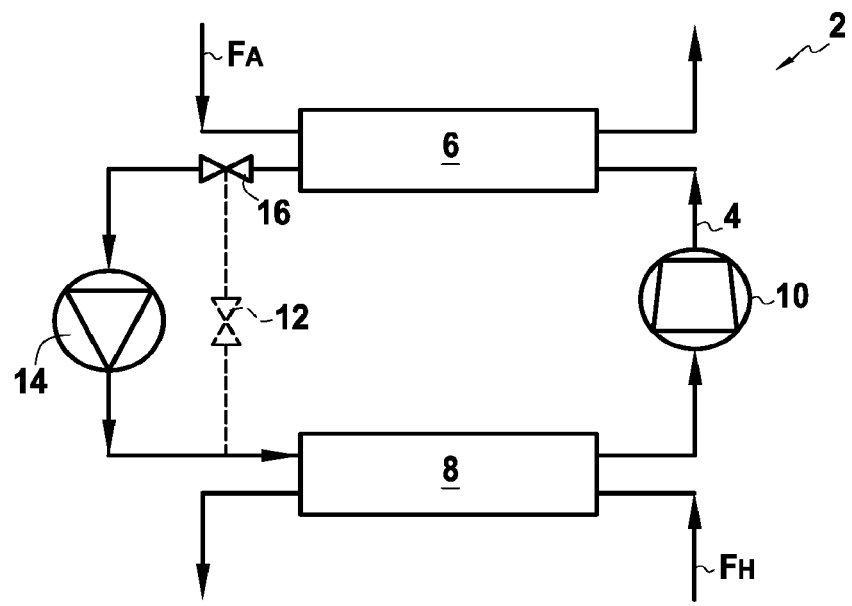

As shown in FIGS. 1 and 2, the cooling system 2 comprises a refrigerant fluid circuit 4 having a condenser-forming first heat exchanger 6, the first heat exchanger serving to exchange heat between the refrigerant fluid and air bled from the flow passage for the secondary stream through the turbine engine.

The refrigerant fluid circuit 4 also has an evaporator-forming second heat exchanger 8, the second heat exchanger 8 serving to exchange heat between the refrigerant fluid and oil coming from the oil circuit.

Upstream from the first heat exchanger 6 (in the flow direction of the refrigerant fluid), and downstream from the second heat exchanger 8, the refrigerant fluid circuit further includes a scroll compressor 10.

A scroll compressor (also known as a spiral compressor) is a known type of compressor that makes use of two interleaved scrolls as vanes for pumping and compressing fluid. Generally, one of the scrolls is stationary while the other moves eccentrically without rotating so as to pump and then hold captive and finally compress pockets of fluid between the scrolls.

The scroll pump 10 is an apparatus that is reversible and can thus be caused to operate in alternation in two different modes, namely as a compressor or as a turbine. These different operating modes are described below.

The refrigerant fluid circuit further includes an expander 12 (or expansion valve) and a pump 14 that are connected in parallel downstream from the first heat exchanger 6 and upstream from the second heat exchanger 8. A control valve 16 (e.g. of the thermostatic type) is arranged upstream from the expander 12 and the pump 14 so as to be able to direct the refrigerant fluid either to the expander when the temperature of the air is greater than a predefined threshold pressure or else to the pump when the temperature of the air is less than this threshold temperature. The predefined threshold temperature may vary as a function of the heat power to be dissipated from the oil. By way of example, it may be set at 20° C.

The cooling system of the invention operates as follows.

During stages of flight in which the temperature of the air flowing through the flow passage for the secondary stream in the turbine engine is greater than the predefined threshold temperature (e.g. stages of idling on the ground under hot conditions), the cooling system of the invention operates as a heat pump (FIG. 1).

In this mode of operation, the refrigerant fluid is heated and vaporized in the second heat exchanger 8 using the heat taken from the oil of the cooling circuit (the flow of oil through the second heat exchanger is represented by arrow $F_H$). The vapor is then compressed (to high temperature and high pressure) by the scroll compressor 10 operating as a compressor.

Thereafter, the refrigerant fluid is condensed with air by the first heat exchanger 6 (the air stream through the first heat exchanger is represented by arrow $F_A$) so as to be finally expanded by passing through the expander 12. More precisely, the control valve 16 is activated (preferably automatically if it is a thermostatic type valve) in order to bypass the pump 14 and direct all of the refrigerant fluid that has passed through the first heat exchanger to the expander 12.

In this mode of operation, it is possible in particular to raise the temperature of the refrigerant fluid to temperatures that are much higher than the temperature of the oil, thereby enabling the efficiency of the first heat exchanger 6 to be increased and thus limiting its size so as to avoid impacting the overall performance of the turbine engine.

During stages of flight in which the temperature of the air is lower than the predefined threshold temperature (which corresponds for example to stages of cruising flight in nominal or cold conditions), the temperature difference between the oil and the air becomes large enough to transform the power dissipated by the heat of the oil into mechanical work. The cooling system of the invention then operates as an organic Rankine cycle (FIG. 2).

In this mode of operation, the refrigerant fluid is heated and vaporized in the second heat exchanger 8 by the heat of the oil (the oil flow through the second heat exchanger is represented by arrow $F_H$), and then the vapor is expanded in the scroll compressor 10, which then operates as a turbine in order to produce mechanical work.

The vapor is then condensed with air by the first heat exchanger 6 (the air flow through the first heat exchanger is represented by arrow $F_A$) and is transformed into liquid, which is then pumped by the pump 14. More precisely, the control valve 16 is activated to bypass the expander 12 and to direct all of the refrigerant fluid that has passed through the first heat exchanger to the pump 14.

In this mode of operation, which corresponds to the longest stages of operation of the turbine engine during a flight, the cooling system delivers mechanical work (instead of consuming it), thereby enabling the performance of the engine to be improved. For example, this mechanical work may be used to deliver power to hydraulic pumps pumping fuel or oil.

Figure 3:
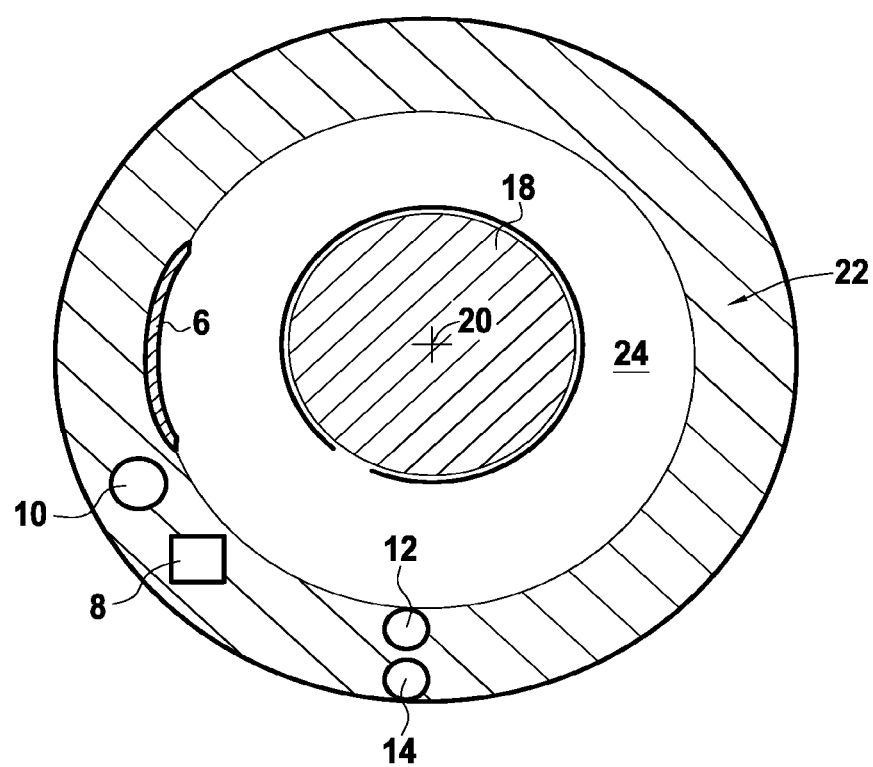
FIG. 3 is a diagrammatic cross-section view of a turbine engine showing the physical locations of the elements of the system shown in FIGS. 1 and 2.

FIG. 3 is a diagram showing an example of how the various elements of the cooling system of the invention can be installed within a two-spool bypass type turbine engine.

FIG. 3 is a cross-section showing the gas generator 18 of the turbine engine centered on a longitudinal axis 20 of the engine. The gas generator is surrounded by a nacelle 22 that is likewise centered on the axis 20 so as to co-operate therewith to define an annular flow passage 24 for the secondary stream.

The air used as the cold source by the cooling system of the invention in this example is preferably air coming from the flow passage 24 for the secondary stream through the turbine engine. For this purpose, the first heat exchanger 6 is positioned in the flow passage for the secondary stream, e.g. against an inside surface of the nacelle 22 that defines the outside of the passage.

The second heat exchanger 8, the scroll compressor 10, the expander 12, and the pump 14 can all be positioned directly in the nacelle 22 of the turbine engine.

The invention claimed is:

1. A reversible system for dissipating heat power generated in a gas turbine engine, the system comprising:
   a condenser-forming first heat exchanger for exchanging heat between a refrigerant fluid and a cold source;
   an evaporator-forming second heat exchanger for exchanging heat between the refrigerant fluid and a hot source generating heat power;
   a scroll compressor arranged upstream from the first heat exchanger and downstream from the second heat exchanger; the scroll compressor for operating as a compressor when a temperature of the cold source is higher than a predefined threshold temperature and as a turbine when the temperature of the cold source is lower than the predefined threshold temperature;
   an expander and a pump arranged in parallel downstream from the first heat exchanger and upstream from the second heat exchanger; and
   a control valve arranged upstream from the expander and the pump for directing the refrigerant fluid to the expander when the temperature of the cold source is higher than the threshold temperature and to the pump when the temperature of the cold source is lower than the threshold temperature.

2. The system according to claim 1, wherein the hot source generating heat power is an oil of an oil circuit of the gas turbine engine and the cold source is air coming from a flow passage for a secondary stream through the gas turbine engine.

3. The system according to claim 2, wherein the first heat exchanger is for positioning in the flow passage for the secondary stream through the gas turbine engine.

4. The system according to claim 2, wherein the second heat exchanger, the scroll compressor, the expander, and the pump are positioned in a nacelle gas turbine of the engine.

5. A gas turbine engine including an oil circuit and a reversible system, the reversible system comprising:
   a condenser-forming first heat exchanger for exchanging heat between a refrigerant fluid and a cold source;
   an evaporator-forming second heat exchanger for exchanging heat between the refrigerant fluid and a hot source generating heat power;
   a scroll compressor arranged upstream from the first heat exchanger and downstream from the second heat exchanger; the scroll compressor for operating as a compressor when a temperature of the cold source is higher than a predefined threshold temperature and as a turbine when the temperature of the cold source is lower than the predefined threshold temperature;
   an expander and a pump arranged in parallel downstream from the first heat exchanger and upstream from the second heat exchanger; and
   a control valve arranged upstream from the expander and the pump for directing the refrigerant fluid to the expander when the temperature of the cold source is higher than the threshold temperature and to the pump when the temperature of the cold source is lower than the threshold temperature, and
   wherein the reversible system dissipates heat power generated by an oil of the oil circuit.

6. A method of operating a reversible system according to claim 1, wherein:
   the control valve is activated to direct all of the refrigerant fluid that has passed through the first heat exchanger to the expander when the temperature of the cold source is higher than the predefined threshold temperature, the scroll compressor then acting as a compressor; and the control valve is activated to direct all of the refrigerant fluid that has passed through the first heat exchanger to the pump when the temperature of the cold source is lower than the predefined threshold temperature, the scroll compressor then operating as a turbine.

* * * * *